PIERRE MARCEL LAPOSTOLLE
INVENTOR
BY Haseltine, Lake & Co.
AGENTS.

Sept. 23, 1952 P. M. LAPOSTOLLE 2,611,832
ULTRAHIGH FREQUENCY TRAVELING-WAVE TUBE
POWER REGULATING SYSTEM
Filed July 26, 1951 8 Sheets-Sheet 8

PIERRE MARCEL LAPOSTOLLE
INVENTOR

BY Haseltine, Lake & Co.
AGENTS

Patented Sept. 23, 1952

2,611,832

UNITED STATES PATENT OFFICE 2,611,832

ULTRAHIGH FREQUENCY TRAVELING-WAVE TUBE POWER REGULATING SYSTEM

Pierre Marcel Lapostolle, Saint-Germain-en-Laye, France

Application July 26, 1951, Serial No. 238,651
In France August 7, 1950

8 Claims. (Cl. 179—171)

This invention is for improvements in or relating to a system for regulating the power of output signals and in particular for ultra-high frequency amplifiers and has for one of its objects the provision of a regulating arrangement in which one or more traveling-wave amplifying electron tubes are employed and which operates directly at ultra-high frequency, by making the gain of the tube or tubes dependent upon the ultra-high frequency energy received at the output end of the arrangement, through a circuit hereinafter referred to as a "feedback loop," the arrangement possessing particular properties due to a periodic auxiliary amplitude modulation to which the signal, the power of which is to be subsequently regulated and which is applied to the input end of the arrangement, is subjected before its amplification by the amplifying tube or tubes. The frequency of this auxiliary modulation is a low frequency and is in any case lower than the lowest modulation frequency present in the signals to be regulated.

A further object of the present invention is to provide a regulating arrangement independent of the precise characteristics of the elements of the said feedback loop.

It must be clearly understood that it is assumed that the useful modulation of the ultra-high frequency signals which it is desired to amplify is generally a frequency modulation or a phase modulation, since, having regard to the lack of amplitude linearity of traveling-wave tubes, the employment of amplitude modulation would afford serious disadvantages.

The theory and the construction of traveling-wave tubes have been generally described notably in a paper by John R. Pierce and Lester M. Field, entitled "Traveling-wave tubes," published in the journal, "Proceedings of the Institute of Radio-Engineers," vol. 35, page 108 et seq., February 1947. It will merely be recalled here that such a tube comprises essentially an electron-emitting cathode, an electrode assembly serving to form an electron beam and called an electron gun," comprising notably one or more accelerating electrodes hereinafter called "first anode," "second anode," etc., a helicoidal transmission line (or more generally, low propagation velocity transmission line) within which the beam passes, hereinafter more briefly called "helix," and an electrode for collecting the electrons of the beam. It is known that the gain of the tube depends primarily on the mean potentials with respect to the cathode, of the accelerating electrodes and of the helix.

In order to achieve the object of the present invention, employment is made of the fact that the characteristic "output power-input power" curves of most types of travelling-wave tubes at different values of the helix voltage and a constant first-anode voltage have maxima of substantially constant value. The characteristic method of the present invention thus consists in applying, by means of suitable low-frequency modulating voltage and modulating agency, an amplitude modulation to the signal to be regulated prior to its application to the input of the amplifying tube and in automatically adjusting the helix voltage to the value at which the output power corresponding to the mean value of the power of the input signal thus modulated is a maximum one. This is done by employing the characteristics of the modified low-frequency modulation which is found at the output from the amplifying tube and, more specifically, the relationship of the phase of the so modified modulation to the phase of the amplitude modulation of the signal at the input of the amplifying tube or to that of the above-said modulating voltage. The method employed in accordance with the present invention therefore differs from the known regualting method in which a low-frequency modulation introduced into the amplifier tube itself or into the output circuit thereof is employed. This particular arrangement is, in fact, necessary for permitting an effective regulation, not in respect of the accidental variations of the feed voltages of the tube alone, but also, and above all, in respect to considerable variations of the power of the signal applied to its input.

A variation of the invention is applicable to the case of certain types of traveling-wave tubes in which the maxima of the output power at different values of the helix voltage and a constant first-anode voltage have not a constant value. It is then generally possible to find pairs of "helix voltage-first-anode voltage" values, with which these maxima are substantially constant. The characteristic method of the present invention consists, in this case, in applying an amplitude modulation to the signal to be regulated previously to its being amplified by the traveling-wave tube, and in automatically and simultaneously adjusting both helix voltage and first-anode voltage to the values at which the output power corresponding to the mean value of the input signal thus modulated is a maximum one.

Further objects and features of the present invention will be more particularly described with reference to the accompanying drawings in which.

Although the present invention does not necessitate the use of traveling-wave tubes of any particular type, the present description has been based on tubes of a particular type including a special method of connection of input and output circuits, but this does not to any extent limit the scope of the invention.

Figure 1:
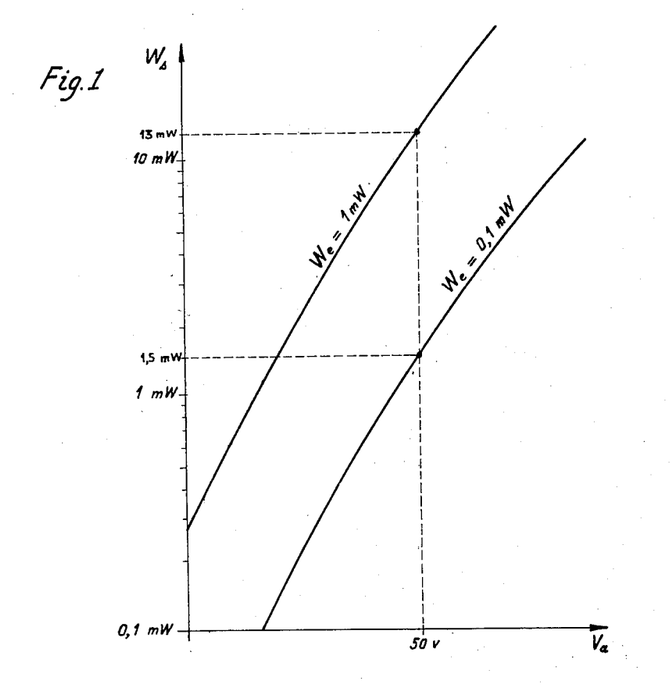
Figure 1 illustrates the characteristic "output power-first-anode voltage" curves of a traveling-wave tube for different values of the input power.

Referring to the drawings and in particular to Figure 1, there is illustrated, as a function of the voltage applied to the first anode $V_a$ of a traveling-wave tube, the value of the output power of this tube at different values of the input power and for a constant helix voltage. It will be seen from Figure 1 that if the voltage of the first anode is varied at a frequency $f$, for example sinusoidally, there is obtained at the output end of the tube a signal amplitude-modulated at this same frequency $f$ around a certain mean value depending upon the power of the input signal. If, for example, the voltage of the first anode is sinusoidally varied at the frequency $f$ about the value 50 volts, the output power is modulated about 13 milliwatts if the input power is 1 milliwatt and about 1.5 milliwatts if the input power is 0.1 milliwatt.

Figure 2:
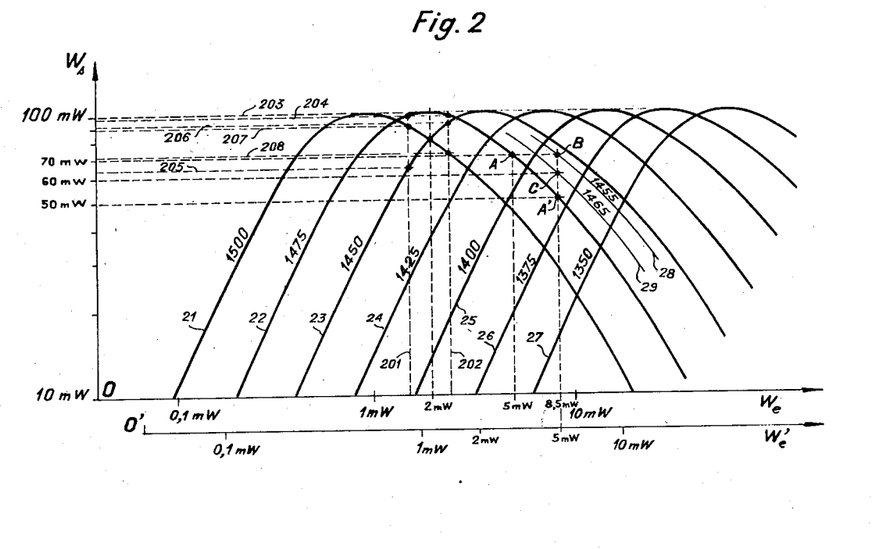
Figure 2 illustrates the characteristic "output power-input power" curves of a traveling-wave tube for different values of the helix voltage in the case where the maxima of these characteristics are constant for a common first-anode voltage.

Figure 2 illustrates, as a function of the input power $W_e$ applied to the traveling-wave tube, the power $W_s$ obtained at its output for various potential differences applied between the cathode and the helix. It will be assumed for the instant that the electron-optical system of the tube is such that, regardless of the potential difference between the cathode and the helix, the cathode current and the current of the collecting electrode are constant. Under these conditions, the curves such as 21, 22, 23, 24, 25, 26 and 27 corresponding to different helix voltages, for example 1500, 1475, 1450, 1425, 1400, 1375 and 1350 volts and to a constant first-anode voltage, for example 80 volts, each have a maximum and these maxima are the same, for example 100 milliwatts in the example illustrated.

Regardless of the ultra-high frequency power applied to the input of the tube, it will be seen that there exists a voltage applied to the helix at which the output power passes through a maximum, the first-anode voltage being maintained constant.

For an input power of 1 milliwatt, for example, the output power passes through a maximum of 100 milliwatts if a potential difference of 1500 volts is applied between the cathode and the helix. If the input power varies by $\pm 50\%$ of 1 milliwatt, the output power does not vary by more than 3% for this same helix voltage and the output power variations would be only 0.03% if the input power varied by $\pm 5\%$.

The combination of Figures 1 and 2 shows that if the first-anode voltage of a traveling-wave tube is varied, for example sinusoidally, there is obtained for a given input signal an output signal amplitude-modulated about a certain mean value and that if this amplitude-modulated signal is applied to the input of a second traveling-wave tube, there exists for this second tube a helix voltage at which the output signal power passes through a maximum value. By making the helix voltage of the said second tube dependent upon the mean value of the input signal of the same tube, a limiting arrangement is obtained.

In order clearly to illustrate the difference between the arrangement according to the present invention and a simple automatic gain-control arrangement, such as can be simply obtained at ultra-high frequency, an arrangement of the latter type will be described with reference to Figure 4. It will be recalled that the latter arrangement is no part of the invention.

Figure 4:
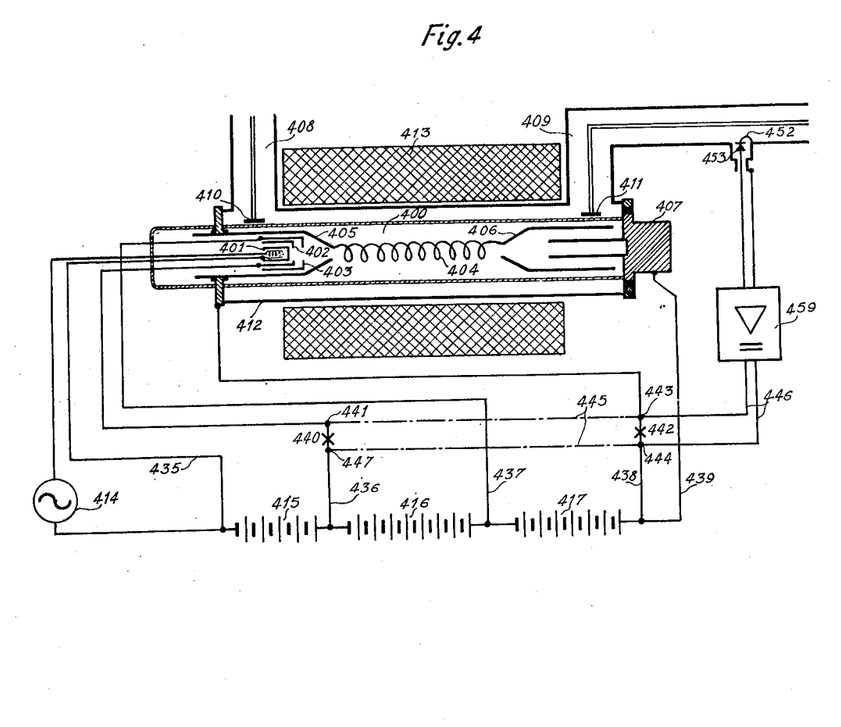
Figure 4 illustrates an arrangement of a previously known type for regulating the power of a traveling-wave tube.

In Figure 4, there is illustrated a traveling-wave tube 400, having a cathode 401, accelerating electrodes or first and second anodes 402 and 403 of the electron gun, a helix 404, hollow cylindro-conical end members 405 and 406 for the adaptation of the input and output circuits to the helix 404, a target 407 collecting the electrons of the electron beam after they have passed through the interior of the helix 404, coaxial input and output lines 408 and 409 for the signal, conductive plates 410 and 411 capacitively coupling the internal conductors of the said coaxial lines with the cylindro-conical end members, 405 and 406, a screening 412 to which the outer conductors of the coaxial lines 408 and 409 are connected, and a magnetic beam-focussing coil 413.

An alternating current source 414 is employed for heating the cathode while batteries 415, 416 and 417 are employed for feeding respectively the first anode 402, the second anode 403, the helix 404 and the target 407 by means of connections, 436, 437, 438 and 439. The cathode 401 is connected to the negative terminal of 415 by the connection 435.

An input ultra-high frequency signal is applied to the line 408. A fraction of the amplified signal power is derived from the output line 409 by a loop 452 and detected by a detector 453. The direct-current voltage from this detector is amplified in a direct-current amplifier 459 and added with a suitable sign to the potential of one of the electrodes of the tube, which control the gain thereof. The voltage thus detected and amplified may be applied to the helix 404, in which case the connection 438 is opened at 442 and line 446 is connected to points indicated at 443 and 444, line 445 being omitted.

The same detected and amplified voltage may be applied to a first anode, in which case the connection 436 is opened at the point indicated at 440 and the line 446 extended by the line 445 is connected to the points 441 and 447. No connection then exists at the points 443 and 444.

Considering, for example, the case where the detected and amplified voltage is applied to the helix of the tube, it will be seen that the regulating system described is simply a linear control system. The power of the input signal being, for example, 5 milliwatts and the helix voltage 1475 volts, the representative point is at A and the output signal has a power of 70 milliwatts. As the input signal increases and reaches, for example, the value 8.5 milliwatts, the representative point moves from A to A' on the characteristic curve 22. The power of the output signal falls to 50 milliwatts. Simultaneously, the voltage applied to the helix decreases.

The point B corresponding, for the new input power of 8.5 milliwatts, to an output power of 70 milliwatts is situated on the curve 28 of the helix voltage of 1455 volts. It will be assumed for the sake of definition that the characteristic curves of the feedback loop constituted by the loop 452, the detector 453 and the amplifier 459 are such that if the output power falls from 70 milliwatts to 50 milliwatts, the helix voltage falls precisely from 1475 volts to 1455 volts. The representative point of the operation returns, under the action of the regulating system, from A' to C between A' and B, the point C corresponding to a new output level of 60 milliwatts on the curve 29 of the helix voltage of 1465 volts.

It will be seen that, according to whether the gain of the amplifier 459 is higher or lower, the variations of the output level of the tube 400 are more or less reduced with respect to those of the input level, but the output level necessarily varies in the same direction as the input level because an error voltage (voltage across the output terminals of 459) is required to control the regulating system.

However, the output level essentially depends upon the characteristic curves of the loop 452, of the detector 453 and of the amplifier 459.

Now, the detectors employed at ultra-high frequency, while having sufficient stability for other applications, are far from possessing constant characteristic curves. On the one hand, these characteristics vary with temperature and even sometimes simply with time. On the other hand, a very considerable dispersion exists between the individual characteristics of a number of detectors. This dispersion not only affects the detection output but may also take effect by the impedance presented at ultra-high frequency to the fraction of energy caught by the loop 452. If the precaution is not taken of making a number of delicate adjustments at the time when a detector is replaced, the arrangement described may provide, at the output, ultra-high frequency signal levels varying within a wide range, which may easily reach 10 decibels.

Moreover, if the traveling-wave tube 400 is replaced by another tube, it frequently happens that all the characteristic curves of Figure 2 are displaced to the left or the right while the maxima of the different curves retain a value which is remarkably constant for different tubes of similar construction. On Figure 2, the displacement of all the characteristic curves by a movement of the axis of the abscissae $OW_e$ now occupying the position $O'W'_e$ is illustrated.

With the first tube, the point A corresponds to an output level of 70 milliwatts and to a helix voltage of 1475 volts. The characteristic curves of the feedback loop are such that if the output level falls to 50 milliwatts the helix voltage is reduced by 10 volts and assumes the value 1465 volts. The output level is then raised to 60 milliwatts.

With another tube, the curve might be displaced to the left, for example; that is to say, the graduation borne by $OW_e$ would be displaced to the right so as to reach $O'W'_e$. The representative point corresponding to a signal of the same input power 5 milliwatts as before and to the same output power of 70 milliwatts is at B on the curve 28 corresponding to a helix voltage of 1455 volts. Now, the curves of the feedback loop not having changed, a helix voltage of 1475 volts would correspond to an output signal of 70 milliwatts. Assuming this to be the case, the point B will therefore be moved towards the point A' at the intersection of the straight line of abscissa 5 milliwatts and of the curve 22. It will stop at the point C of ordinate 60 milliwatts on the curve 29 of the helix voltage of 1465 volts. The regulation which previously took place about the level of 70 milliwatts, will be set up about the level of 60 milliwatts with the new tube.

The regulating arrangement according to the present invention which is now to be described has the essential feature that it supplies an output signal level which is completely independent both of the precise characteristics of the loops and of the detectors and amplifiers employed. A variation of the characteristic curves of the latter can at the most slightly modify the point of adjustment of the helix voltage about the optimum, but the corresponding variation of output level is quite negligible.

Figure 5:
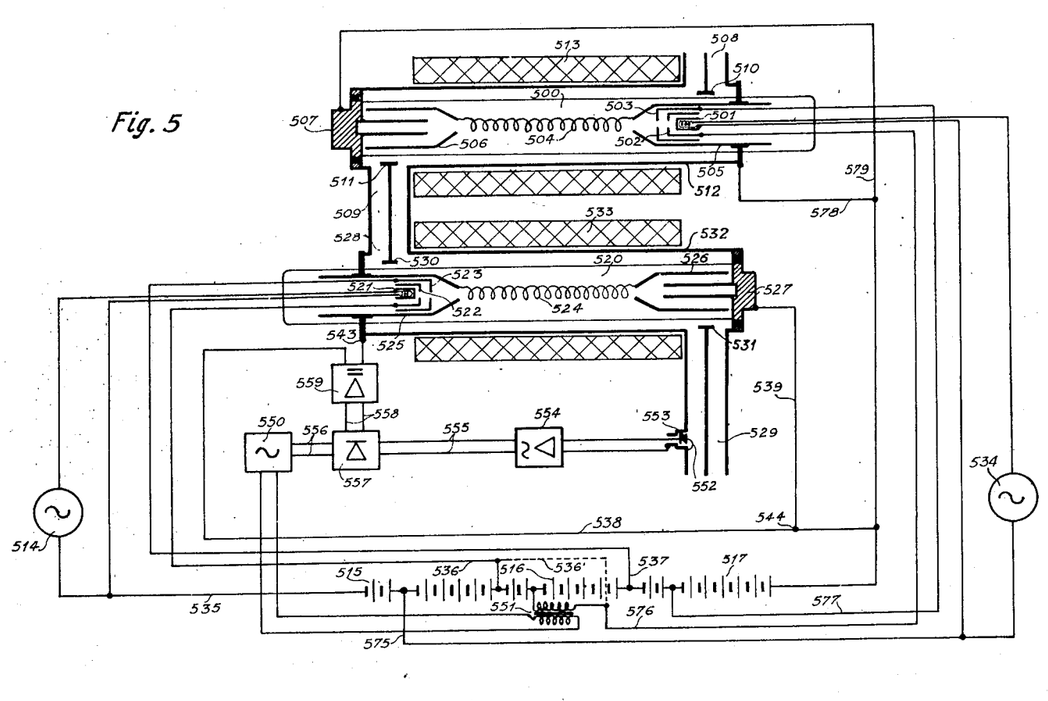
Figure 5 illustrates a regulating arrangement according to subject matter of the present invention.

Figure 5 illustrates an embodiment of the present invention, in which there are provided two traveling-wave tubes 500 and 520 having cathodes 501 and 521, and accelerating electrodes 502, 503, 522 and 523 of the electron guns, 504 and 524 are the lines having a low velocity of propagation, constituted by helices, 505 and 525 are hollow cylindro-conical end members for the adaptation of the output circuits to the helix, 506 and 526 similar cylindro-conical end members for the adaptation of the circuits to the helix and 507 and 527 targets collecting the electrons of the electron beams after they have passed through the helices. The first tube 500 only plays the role of an amplitude-modulator and may be replaced by any suitable modulating agency.

The input and output lines for the energy are coaxial lines 508, 509, 528 and 529, the outer conductor of which is connected to the screenings 512, 532 of the tubes and the internal conductor of which is terminated by plates such as 510, 511, 530 and 531 capacitively coupled with the cylindro-conical end members. 513 and 533 are the beam-focussing coils.

514 is a source of alternating current for the heating of the cathode 521 of the tube 520. Series-connected batteries such as 515, 516, 517 supply the various positive D. C. voltages necessary to the system and are provided with a number of tappings to this effect. Thus the cathode 521 is connected through connection 535 to the negative terminal of 515, while the first accelerating electrode 522, the second accelerating electrode 523, the helix 524 and the target 527 are respectively fed from the batteries 515 to 517 through the connections 536, 537, 538, 539.

Similarly, 534 is a source of alternating current for heating the cathode of the tube 500. The cathode, the first accelerating electrode 502, the second accelerating electrode 503, the helix 504 and the target 507 are fed through the connections 575, 576, 577, 578 and 579.

The element 550 is a low-frequency oscillator generating a signal of fixed-frequency of the order of some hundred cycles per second, for example, which is supposed to be lower than the lowest modulation frequency present in the signals amplified by both the tubes 500 and 520.

This signal is applied through a transformer 551 to the first anode 502 of the traveling-wave tube 500 which amplifies the ultra-high frequency signal received through the coaxial input line 508.

It will be seen from the curves illustrated in Figure 1, that, since the potential of the anode 502 varies at the frequency $f$, the signal leaving the tube 500 through the coaxial output line 509 will be amplitude-modulated at the frequency $f$ about an average value equal to the output power $W_s$ corresponding to the input power $W_e$.

The output signal of the tube 500 is then applied by the coaxial input line 528 constituting the extension of the coaxial output line 509 to the input of the tube 520 constituting the actual regulating tube of the arrangement.

Referring to the Figure 2, it will readily be seen that:

If the voltage of the helix 524 is fixed at the potential of 1475 volts giving the maximum output power, that is 100 milliwatts, for a signal of given mean input power, for example 2 milliwatts, the amplitude modulation of this input signal at the frequency $f$ between the straight lines 201 and 202 will give an amplitude modulation of the output signal at the frequency $2f$ between the straight lines 203 and 204;

If the voltage of the helix 524 is lower than the previous value, called the "optimum" value, and is equal for example to 1450 volts, the same amplitude modulation of the input signal will give an amplitude modulation of the output signal between the straight lines 205 and 206, constituted by an amplitude modulation of the frequency $2f$ superposed on an amplitude modulation at the frequency $f$ in phase with the modulation of the input signal;

If the voltage of the helix 524 is higher than the previous value and is equal for example to 1500 volts, the same amplitude modulation of the input signal will give an amplitude modulation of the output signal between the straight lines 207 and 208, constituted by an amplitude modulation at the frequency $2f$ superposed on an amplitude modulation at the frequency $f$ in phase opposition to the modulation of the input signal.

A fraction of the output signal, leaving the amplifier tube 520 through the coaxial output line 529, is caught by the loop 552 and detected by the detector 553. The detected voltage is amplified in the amplifier 554, which is preferably selective and tuned to the frequency $f$. In the output line 555 of the said amplifier there is available an amplified signal of frequency $f$, which is in phase with, or in phase opposition to the signal generated by the oscillator 550 according to whether the voltage of the helix 524 is lower or higher than the optimum voltage (neglecting the slight phase displacements in transmission through the amplifier 554).

The output signals of frequency $f$ of the amplifier 554 and of the oscillator 550 are applied through the connections 555 and 556 to a phase detector device 557 which imparts to the output connections 558 a positive voltage if the two signals are in phase, a negative voltage if these same signals are in phase opposition and a zero voltage if the signal from 554 is zero. Phase detectors having these properties are well known in the art.

The voltage set up along the output line 558 is amplified in a direct current amplifier 559 and the voltage delivered by 559 is applied between the points 543 and 544, that is to say, it serves to adjust the voltage of the helix 524 of the tube 520.

If it is assumed that the voltage of the helix 524 is lower than the optimum voltage, the signals in 555 and 556 are in phase; the voltage delivered by 557 will be positive, as also will be the voltage delivered by 559, and the voltage of the helix will rise to its optimum value.

Assuming now that the voltage of the helix 524 is higher than the optimum voltage, the signals in 555 and 556 are in phase opposition; the voltage delivered by 557 will be negative as also will be the voltage delivered by 559 and the voltage of the helix will fall to its optimum value.

Regulation is therefore effected at the optimum voltage and the output level is completely independent of the characteristic curves of the loop 552, of the detector 553 and of the stability of the gain of the amplifiers 554 and 559. Moreover, the loop 552 can be simply constructed as illustrated in Figure 5. Naturally, it is necessary to effect a coupling of the loop 552 and a matching of the detector 553 in as wide a frequency band as possible in order that their characteristic curves may not vary substantially in the actual frequency band transmitted. Similarly, it is desirable that the output line 529 should supply a load (for instance an aerial) substantially matched so that it may not be the cause of stationary waves in the said line. However, these conditions are in no way essential as they would be in the arrangement illustrated in Figure 4, in which, more particularly if the line 409 were not matched, it would be essential for the loop to be of the directional coupler type. In the regulating arrangement of the present invention, such a type of loop is not required.

The arrangements such as 557, hereinabove called "phase detectors" by means of which it is possible to obtain, from an alternating current signal of given frequency, a direct-current signal of proportional amplitude, the polarity of which is positive if the said alternating-current signal is in phase with a reference signal of equal frequency, and the polarity of which is negative if the alternating-current signal is in phase opposition to the reference signal, are well known in the art. In order to render the specification complete, Figure 6 illustrates such an arrangement.

Figure 6:
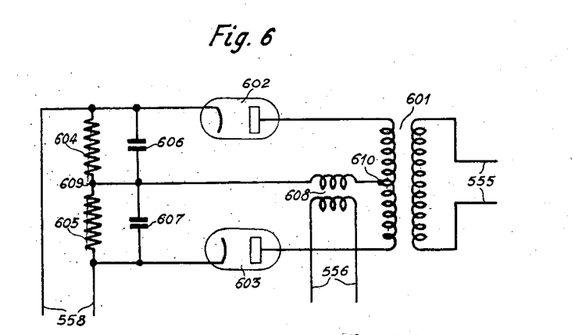
Figure 6 illustrates diagrammatically the details of a phase detector which is an essential part of the system, the object of the invention.

In Figure 6, the signal of which it is desired to detect the phase relatively to the reference signal, is applied through connections 555 to the primary winding of a transformer 601 comprising a mid-point secondary winding. The voltage of each half of the secondary winding is rectified in a diode 602 and 603 and then applied to resistances 604 and 605 and filtered by condensers 606 and 607. The diodes 602 and 603, the resistances 604 and 605 and the condensers 606 and 607 are identical in pairs.

The signal of which the phase serves as a reference is applied through connections 556 to the primary winding of a transformer 608, the secondary winding of which is inserted between a common point 609 of the resistances 604 and 605 and of the condensers 606 and 607 and a mid-point 610 of the secondary winding of the transformer 601. Under these conditions, there is obtained across the terminals of an output line 558 a direct-current voltage substantially proportional to the amplitude of the signal applied at 555 and the polarity of which depends upon the phase relationship between the signal applied through 555 and the reference phase signal.

With the arrangement illustrated in Figure 5, it is possible, in accordance with the example given, to obtain an output level constant to within 0.03% when the input level varies by about 5%. The arrangement described with reference to Figure 7 enables the range of variation of the input signal to be varied up to about 50%. This arrangement is characterized by a cascade connection of two arrangements of the type illustrated on Figure 5.

Figure 7:
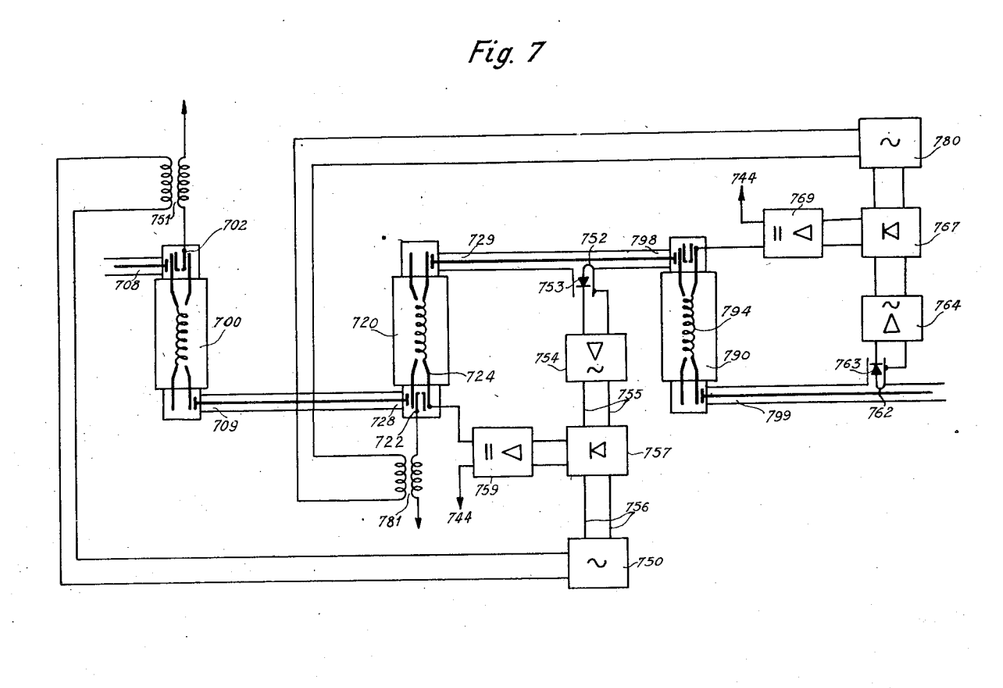
Figure 7 illustrates a two-stage regulating arrangement.

Referring to Figure 7 element 750 is a low-frequency oscillator generating a signal of fixed frequency $f$. This signal is applied through a transformer 751 to a first anode 702 of a traveling-wave modulating tube 700, which amplifies the ultra-high frequency signal received by a coaxial input line 708.

The signal leaving the tube 700 through a coaxial output line 709 is amplitude-modulated at the frequency $f$. This signal is then applied through a coaxial input line 728 forming an extension of the line 709 to the input of a tube 720.

A fraction of the output signal leaving the amplifying tube 720 through a coaxial output line 729 is caught by a loop 752, detected by a detector 753, amplified in a selective amplifier 754 (tuned to the frequency $f$) and applied to a phase detector 757, which also receives a phase reference signal coming from the oscillator 750.

The output signal from 757 is amplified by a direct-current amplifier 759 and applied between a helix 724 and the high voltage lead 744.

Element 780 is a second low-frequency oscillator generating a signal of fixed frequency $f'$ different from $f$. This signal is applied through a transformer 781 to a first anode 722 of the traveling-wave tube 720. The signal leaving the tube 720 through the coaxial output line 729 is applied to a tube 790 through an input line 798 of the tube 790 forming an extension of the line 729.

A fraction of the output signal leaving the amplifying tube 790 through a coaxial output line 799 is caught by a loop 762, detected by a detector 763, amplified in a selective amplifier 764 tuned to the frequency $f'$, and applied to a phase detector 767 which also receives a phase reference signal from an oscillator 780. The output signal from 767 is amplified by a direct-current amplifier 769 and applied between the helix 794 of the tube 790 and the high voltage lead 744.

Figure 8:
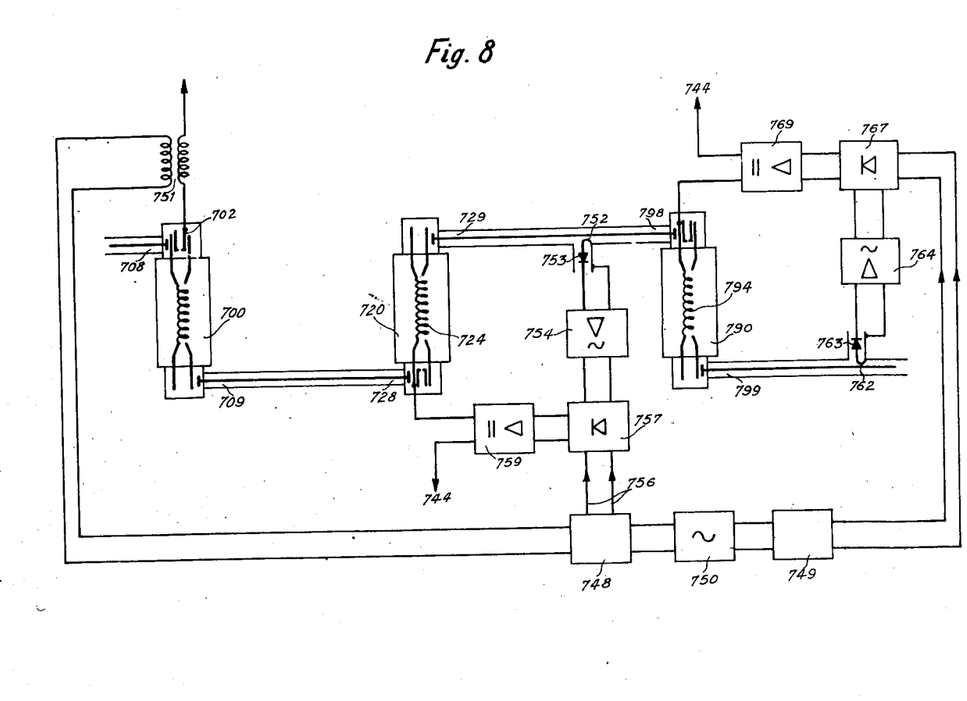
Figure 8 illustrates a modified form of the previous two-stage regulating arrangement.

Figure 8 illustrates an arrangement similar to that of Figure 7, but in which the oscillator 780 at the frequency $f'$ is omitted and in which a harmonic of frequency $2f$ of the frequency $f$ used for the first tube 700 is directly employed as modulation frequency for the second tube 720.

The oscillator 750 then simultaneously produces the frequencies $f$ and $2f$ which are filtered by filters 748 tuned to the frequency $f$ and 749 tuned to the frequency $2f$. The references of Figure 8 have the same signification as those in Figure 7, but the selective amplifier 764 is tuned to the frequency $2f$ instead of being tuned to the frequency $f'$ and the phase detector 767 receives as reference frequency signal the $2f$ frequency signal from the filter 749 instead of receiving the frequency $f'$.

It has hitherto been assumed that the characteristic curves of Figure 2 had maxima of equal ordinates for a constant first-anode voltage. It may happen, as illustrated in Figure 3, that the maximum constant ordinate is obtained, not at different values of the helix voltage, with the first-anode voltage maintained constant, but with pairs of "helix voltage-first-anode voltage" values, and even with combinations of "helix voltage-first-anode voltage-second-anode voltage" values.

Figure 3:
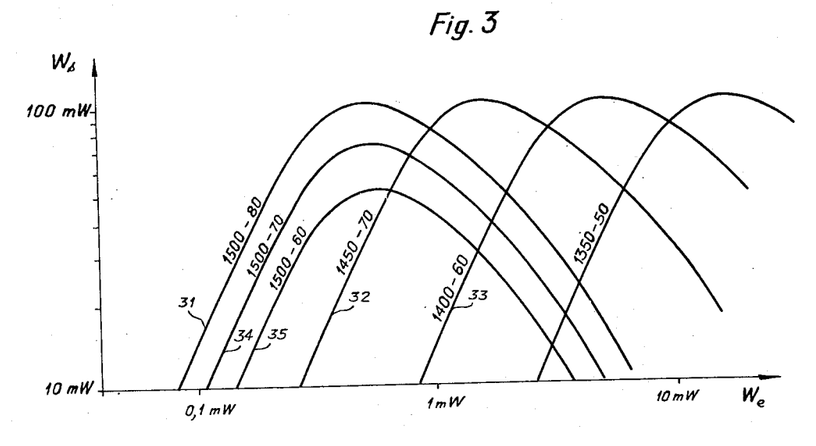
Figure 3 illustrates the characteristic "output power-input power" curves of a traveling-wave tube having constant maxima for different pairs of "helix voltage-first-anode voltage" values.

In Figure 3, for example, the curve 31 corresponds to a helix voltage of 1500 volts and to a first-anode voltage of 80 volts, the curve 32 to a helix voltage of 1450 volts and to a first-anode voltage of 70 volts, and the curve 33 to a helix voltage of 1400 volts and to a first-anode voltage of 60 volts.

It is therefore no longer sufficient to act only on the value of the helix voltage in order to regulate the output power $W_s$ to a maximum corresponding to the mean value of the input power $W_e$ modulated in amplitude, but it is necessary to act at the same time on the first-anode voltage. For this purpose, the direct-current amplifier 559 of Figure 5, comprises two outputs supplying directly proportional voltages. Employment is made of the fact that, in order to pass from the curve 31 to the curve 32 of Figure 3, the helix voltage varies by —50 volts and the first-anode voltage by —10 volts in the example illustrated. It will therefore be sufficient to take from a voltage divider, to the terminals of which a helix correction voltage will be applied, a voltage proportional to the said correction voltage and equal to $1/5$ of its value in order to obtain the first-anode correction voltage.

It has been assumed in Figure 3 that the characteristic curves corresponding to a constant helix voltage and to decreasing first-anode voltages were substantially parallel curves not intersecting one another, such for example as the curves 31 (helix voltage 1500 volts, first-anode voltage 80 volts), 34 (helix voltage 1500 volts, first-anode voltage 70 volts), 35 (helix voltage 1500 volts, first-anode voltage 60 volts), etc. Consequently, with a constant input power $W_e$ the output power is always an increasing function of the first-anode voltage.

Figure 9:
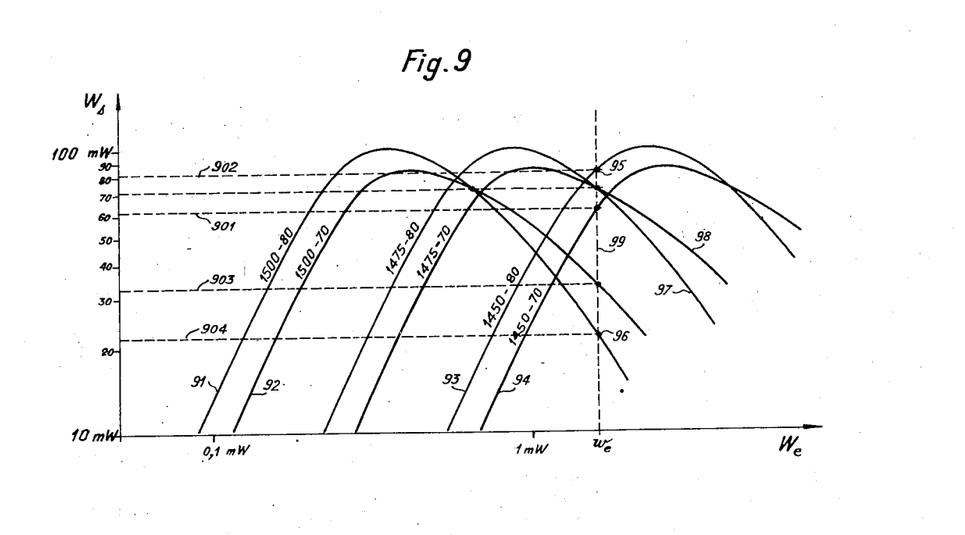
Figure 9 illustrates the characteristic "output power-input power" curves of a traveling-wave tube for different pairs of helix voltage and first-anode voltage values in the case where these characteristic curves corresponding to a common helix voltage and to different first-anode voltages intersect one another.

On the other hand, with certain tubes it may happen that the characteristic curves corresponding to a common helix voltage and to different first-anode voltages intersect one another. This case is illustrated on Figure 9, wherein the corresponding values are:

Curve 91: Helix voltage 1500 volts, first-anode voltage 80 volts; curve 92: Helix voltage 1500 volts, first-anode voltage 70 volts; curve 93: Helix voltage 1450 volts, first-anode voltage 80 volts; curve 94: Helix voltage 1450 volts, first-anode voltage 70 volts.

The regulating arrangement of Figure 5 can then be simplified and needs comprise only one tube, namely the regulator tube 520. The output voltage of the oscillator 550 is no longer fed to the first anode 502, but to the first anode 522.

For this purpose, the connection 576 is broken and the connection 536, instead of being connected directly to the battery is connected to the secondary winding of the transformer 551 (connection 536' illustrated in dot-and-dash lines). In addition, the tube 500 is omitted and the input signal is applied directly to the line 528.

Assuming now that the helix voltage is 1450 volts and that the first-anode voltage varies at the frequency $f$ between 70 and 80 volts, the power of the output signal will be modulated at the frequency $f$ and its amplitude will be represented by a point between the straight lines 901 and 902. This modulation will be in phase with the modulation of the first-anode voltage. In fact, when the latter voltage reaches its maximum value of 80 volts, the representative point for an input signal of power $w_e$ is at 95, at which the power of the output signal reaches its maximum value.

It it is now assumed that the helix voltage is 1500 volts, and the first-anode voltage varies at the frequency $f$ between 70 and 80 volts, the power of the output signal will be modulated at the frequency $f$ and its amplitude will be between the straight lines 903 and 904. This modulation will be in phase opposition to the modulation of the first-anode voltage. In fact, when the latter voltage reaches its maximum value of 80 volts the representative point for an input signal of the same power $w_e$ as before is at 96, at which the power of the output signal reaches its maximum value.

In the first case, the helix voltage will increase, and in the second case it will decrease. This voltage will be fixed, for example, at a value of 1475 volts, at which the point of intersection of the curves 97 and 98 corresponding to a common helix voltage of 1475 volts and to, first-anode voltages of 80 and 70 volts respectively will be situated on the straight line 99 of abscissa $w_e$.

Although the present invention has been described with reference to certain specific examples, its scope is sufficiently defined in the foregoing to enable the person skilled in the art to apply it to any amplifying system in which traveling tubes are employed.

What I claim is:

1. An ultra-high frequency amplifier and power regulating system comprising at least one amplifying and regulating stage comprising a traveling wave-tube including at least a cathode for emitting electrons, an electron gun for forming an electron beam, said electron gun including at least one accelerating electrode, a low velocity of propagation transmission line having input and output terminals and adapted to have said electron beam pass therethrough, and an electron collecting electrode, a load circuit connected to said output terminals of said line, a source of ultra-high frequency signals to be amplified, a low frequency alternating voltage source, an amplitude modulator fed on one hand by signals from said source of ultra-high frequency signals and on the other hand by an alternating voltage from said low frequency source and delivering at its output ultra-high frequency amplitude-modulated signals, means for impressing said amplitude-modulated ultra-high frequency signals upon said input terminals of said low velocity of propagation line, and a feedback loop comprising an ultra-high frequency coupling circuit coupled to above-said load circuit, a detector fed from said coupling circuit and delivering at its output low frequency detected signals, a low frequency amplifier having input terminals fed from output of said detector and delivering at its output an amplified low frequency signal voltage, a phase detector having a first and a second pair of input terminals and a pair of output terminals, said first and second pair of input terminals being respectively fed from said amplified low frequency signal voltage and from a reference phase low frequency voltage from above-said low frequency alternating voltage source, said phase detector being constructed so as to deliver at its output terminals a rectified direct-current voltage of polarity depending upon the phase relationship between voltages respectively applied to its first and second pair of input terminals, and means for applying said rectified direct-current voltage to above-said low velocity of propagation transmission line.

2. A system as claimed in claim 1, wherein a part of said rectified direct-current voltage is fed to an accelerating electrode of the electron gun of said traveling-wave tube.

3. A system as claimed in claim 1, wherein said amplitude-modulator is constituted by an auxiliary traveling-wave tube having an alternating current voltage from said source of alternating current voltage applied to an accelerating electrode of the electron gun of the said auxiliary tube.

4. A system as claimed in claim 1, wherein said low-frequency amplifier is a selective amplifier tuned to the frequency of said low-frequency alternating voltage source.

5. A system as claimed in claim 1, wherein said means for applying said rectified direct-current voltage to said low velocity of propagation transmission line of said traveling-wave tube comprises a direct-current amplifier.

6. A system as claimed in claim 1, comprising two amplifying and regulating stages, wherein the low-frequency alternating voltage sources respectively pertaining to each stage have different frequencies.

7. A system as claimed in claim 6, wherein the frequency of one of said two low-frequency alternating voltage sources is equal to twice the frequency of the other low-frequency alternating voltage source.

8. A system as claimed in claim 7, wherein said alternating voltage source having a frequency equal to twice the frequency of the other low-frequency alternating voltage source consists in a filter tuned to the second harmonic of the frequency of and fed from said other low-frequency alternating voltage source.

PIERRE MARCEL LAPOSTOLLE.

No references cited.